United States Patent [19]

West

[11] 4,361,176
[45] * Nov. 30, 1982

[54] SOUP DISPENSER

[75] Inventor: John B. West, Glyndon, Md.

[73] Assignee: Maryland Cup Corporation, Owings Mills, Md.

[*] Notice: The portion of the term of this patent subsequent to Feb. 19, 1997, has been disclaimed.

[21] Appl. No.: 85,586

[22] Filed: Oct. 17, 1979

Related U.S. Application Data

[63] Continuation-in-part of Ser. No. 915,467, Jun. 14, 1978, Pat. No. 4,189,071, which is a continuation-in-part of Ser. No. 851,950, Nov. 16, 1977, Pat. No. 4,176,766, which is a continuation-in-part of Ser. No. 827,678, Aug. 25, 1977, Pat. No. 4,174,789.

[51] Int. Cl.$^3$ .............................................. B67D 5/02
[52] U.S. Cl. .................................... 141/362; 222/25; 222/146 HE; 222/189; 222/238; 222/332
[58] Field of Search ................................ 222/23, 25–28, 222/36, 146 HE, 189, 236, 238, 332, 345, 370; 141/95, 351, 360, 362

[56] References Cited

U.S. PATENT DOCUMENTS 2,845,964 8/1958 Harland .......................... 141/362 X
3,248,009 4/1966 Sutton et al. ...................... 222/36 X
4,189,071 2/1980 West .................................... 222/189

Primary Examiner—Robert J. Spar
Assistant Examiner—Edward M. Wacyra
Attorney, Agent, or Firm—Birch, Stewart, Kolasch & Birch

[57] ABSTRACT

A soup dispenser is provided which will dispense liquid, semi-liquid and/or chunky soups, stews, chilis, etc., with equal facility. A motor-driven dial configuration of a plurality of measuring chambers or traps is provided at the bottom of a heated reservoir in which an impeller is constantly driven to preclude settling and scorching. The same motor drive is selectively interconnected to rotate the dial and successively register a measuring chamber with a discharge port beneath which a food container can be placed to receive the discharged product. The measuring chambers are vented to atmosphere as registry with the discharge opening is respectively effected to assure full discharge of the food products therein. A dial configuration further includes a plurality of selectively insertable strainer structures which are removably mounted flush with the upper surface of the dial over one or more of the measuring chambers to control the ratio of garnish to broth in each dispensed container of soup and the like. A fail safe system is included to prevent dispensing from taking place in the event that no container has been placed in the dispenser in a position to receive a discharge. The reservoir tank is removable and a disabling switch is actuated upon removal to preclude energization of the dispensing mechanism. Indication lamps and sensing devices are provided to indicate power conditions, heater conditions, liquid content conditions and dispensing conditions.

20 Claims, 8 Drawing Figures

SOUP DISPENSER

This application is a continuation-in-part of my copending application CIP(A) Ser. No. 915,467, filed June 14, 1978, now U.S. Pat. No. 4,189,071, issued Feb. 19, 1980, which is a continuation-in-part of my copending application Ser. No. 851,950, filed Nov. 16, 1977, now U.S. Pat. No. 4,176,766, issued Dec. 4, 1979, which is a continuation-in-part of copending application Ser. No. 827,678, filed Aug. 25, 1977, now U.S. Pat. No. 4,174,789, issued Nov. 20, 1979, all entitled "Soup Dispenser."

FIELD OF THE INVENTION

This invention relates to soup dispensing apparatus and more particularly to soup dispensing and heating apparatus for serving measured quantities of soups by selectively dispensing measured quantities of the soup into containers placed in the apparatus.

BACKGROUND OF THE INVENTION

A number of problems exist with regard to serving soup in its many forms and viscosities with a single serving unit. There is a considerable difference in the characteristics of soups, stews, chilis and the like and accordingly, it is most difficult to provide a universal dispensing device which will handle all these various types of liquid or semi-liquid foods with equal facility.

In order to dispense measured quantites, it has been relatively standard in the prior art devices to provide a single trap chamber or the like for measuring a predetermined single quantity into a container. However, such an approach results in an undue amount of garnish or soup solids in the first bowls out of a pot and a reduced quantity of such solids and hence, an inferior grade of soup in successively dispensed quantities. Once permitted to settle, the soup solids cause the problem to repeat itself.

It is to this problem that the present invention is directed, namely, the provision of dispensing equipment which is equally adapted to highly liquid, semi-liquid, chunky, or viscous soups, stews, and the like and which will deliver predetermined quantities of relatively standard quality either in rapid succession or at relatively random frequencies.

Various conditions of the dispensing apparatus of the present invention should be monitored and visually annunciated when critical parameters exist. For example, the ON condition of each of two heaters, the ON condition of main power, the ON condition of a dispensing cycle, the YES condition of a first number of servings dispensed and the YES condition of a second number of sevings dispensed. The second number of servings is selected as that amount of remaining food product to which new product can be added to refill the reservoir without down time for reheating the food product. This latter feature permits continuous serving of large volumes of customers with a single dispensing apparatus with no down time caused by refills.

Also, a control system is needed to preclude dispensing operations in the absence of a serving receptacle. Further, in the absence of the reservoir, no power should be permitted to flow to the heaters, drive motor, visual annunciation or other control circuit components of the dispensing apparatus.

It is an object of the present invention to provide a new and novel dispensing apparatus for serving measured quantities of hot soups, stews, and other liquid food products.

Another object of the present invention is to provide a new and novel soup and stew and liquid food dispensing apparatus which has self-contained agitating and heating means and a multiple cavity volumetric discharge plate which dispenses predetermined sequences of unit volumes from a reservoir to thereby discharge known measured quantities of the food product.

Another object of the present invention is to provide a new and novel soup and stew and liquid food product dispensing apparatus which has self-contained agitating and heating means and a multiple cavity volumetric discharge plate which dispenses predetermined sequences of unit volumes from a reservoir to thereby discharge known measured quantities of the food product; and which includes selectively insertable strainer assemblies removably mounted over each of the cavities in the said discharge plate.

Still another object of the present invention is to provide a new and novel soup and stew and liquid food product dispensing apparatus which will not dispense in the absence of predetermined conditions and which will provide visual indication of various conditions of the apparatus.

Still another object of the present invention is to provide a new and novel soup and stew and liquid food product dispensing apparatus having a reservoir and a monitoring means determining and visually indicating levels in said reservoir approximate and equal to a level at which food product may be added without interrupting food service because of food temperature variations.

Yet another object of the present invention is to provide a new and novel serving apparatus for soups, stews, and liquid food products which is equally facile in its handling of highly-liquid, semi-liquid, chunky and/or viscous food products and which is readily disassembled for cleaning purposes after a given use cycle.

These and other objects of the present invention will become more fully apparent with reference to the following specification and drawings which relate to a preferred embodiment of the present invention.

SUMMARY OF THE INVENTION

Basically, the soup dispenser and apparatus of the present invention comprises a base stand on which a drive motor is mounted adjacent to a drive shaft and suitable clutch means which, in turn, are connected through an output shaft which extends upward into a reservoir and which mounts an impeller thereon for rotation within the reservoir.

The reservoir includes a heating device, preferably one of the "Crock-Pot" principle in which the heating elements are on the sides of the reservoir to prevent scorching and provide uniform heating and has a lid through which soups, stews, and other liquid or semi-liquid food products may be loaded into the reservoir. A dual-range heating element is provided to permit rapid heating and holding cycles.

At the lower end of the reservoir is a dial-shaped transfer plate in the general configuration of a deep telephone dial-type structure in which a plurality of cavities corresponding to holes in the dial are provided, each cavity defining a given volume for receiving a liquid food product to be dispensed.

The volumetric dial transfer plate is mounted in a housing member which is integrally mounted with the reservoir and opening toward the inner end of the reservoir through a top sealing plate ported for registry with at least one of the volumetric chambers in the dial at a time and which includes a bottom sealing plate having a discharge opening of the same size, shape and cross-section as that of each of the multiplicity of volumetric chambers in the transfer plate.

The top sealing plate is integral with the bottom of the reservoir and provides a discharge port which overlies the volumetric transfer plate adjacent to a continuously energized impeller such that excessive quantities of solids or garnish in the liquid food product in the reservoir are precluded from settling in the transfer plate. The top sealing plate discharge port includes a cutting edge to sever any excess food product solids or garnish which may be projected into a given volumetric cavity in the transfer plate which has been brought into registry with the discharge port as the transfer plate is being rotated to carry the measured volume or product to the final outlet or discharge opening of the dispenser assembly.

A venting means is provided to vent each of the volumetric measuring cavities as they come into registry with the outlet or discharge opening in the transfer plate housing so as to assure that the more viscous products will discharge under the action of gravity from the discharge opening upon registry of a given volumetric measuring cavity therewith.

A spring-loaded face sealing effect is provided for the top and bottom sealing plates to preclude any possible binding of the components due to thermal expansion or contraction when the food product is heated or cooled, respectively, before serving.

The transfer plate is driven by means of a selectively engageable programmed clutching mechanism driven by the drive motor such that by engaging the clutch and programming the number of rotations of a drive pinion engaging an integral ring gear on the circumference of the transfer plate a predetermined number of volumetric cavities are necessarily registered with the outlet opening in the housing. This permits a direct drive such that the drive pinion, the impeller means, and the programmed clutch are all on a common motor shaft.

The volumetric chambers in the transfer plate or dial are provided with counterbores at the upper ends thereof such that they can be selectively fitted with cylindrical, dependent flanges on strainers or perforated discs which are selectively insertable in one or more of the volumetric cavities, such that various combinations of cavities can be covered with a strainer means. This permits adjustment of a given soup dispenser for a given type of soup by empirical determination of just which combination of open cavities and strainer means placed in the cavities of the dial plate provides the most uniform proportions of broth and garnish for a given type of soup over a number of the duty cycles of the soup dispenser. The strainers or perforated discs are flush with the upper surface of the transfer plate or dial and, therefore, are self-cleaning by virtue of the cutting edge on the top sealing plate.

The bottom sealing plate comprises a slide assembly which mounts the dial shaped transfer plate in a drawer-like fashion within the transfer plate housing to remove the said transfer plate and the rest of this assembly for cleaning. The bottom sealing plate and the transfer plate extend outboard of the upper sealing plate and reservoir such that the filled measuring cavities to be discharged are placed in direct communication with both the discharge port in the bottom sealing plate and atmosphere. This provides direct venting means to insure rapid and complete gravity discharge through the discharge opening of each measuring cavity as the latter registers with the former.

Lock-out switches and relay means sense the presence of a discharge receiving container or receptacle beneath the discharge opening on a receptacle support bracket to AND with a dispensing switch for initiating a dispensing cycle. If no receptacle is properly positioned, then no response will be obtained by actuating the dispensing switch.

The ON conditions of each of two heaters are visually indicated by respective visual annunciators.

A rotary cam means is provided to count two ascending numbers of dispensed servings (dispensing cycles) to monitor, for example, a 40% and a 50% depletion condition of the reservoir. Upon the achievement of a 40% depletion condition an operator is advised, for example, to prepare an amount of food stock and water of a predetermined minimum temperature, such as 160° F., equal to 50% of reservoir capacity for addition to the reservoir. Then upon the achievement of the 50% depletion level, the stock and water may be added without the need for down time of the dispenser to reheat to serving temperature.

DETAILED DESCRIPTION OF THE DRAWINGS

Figure 1:
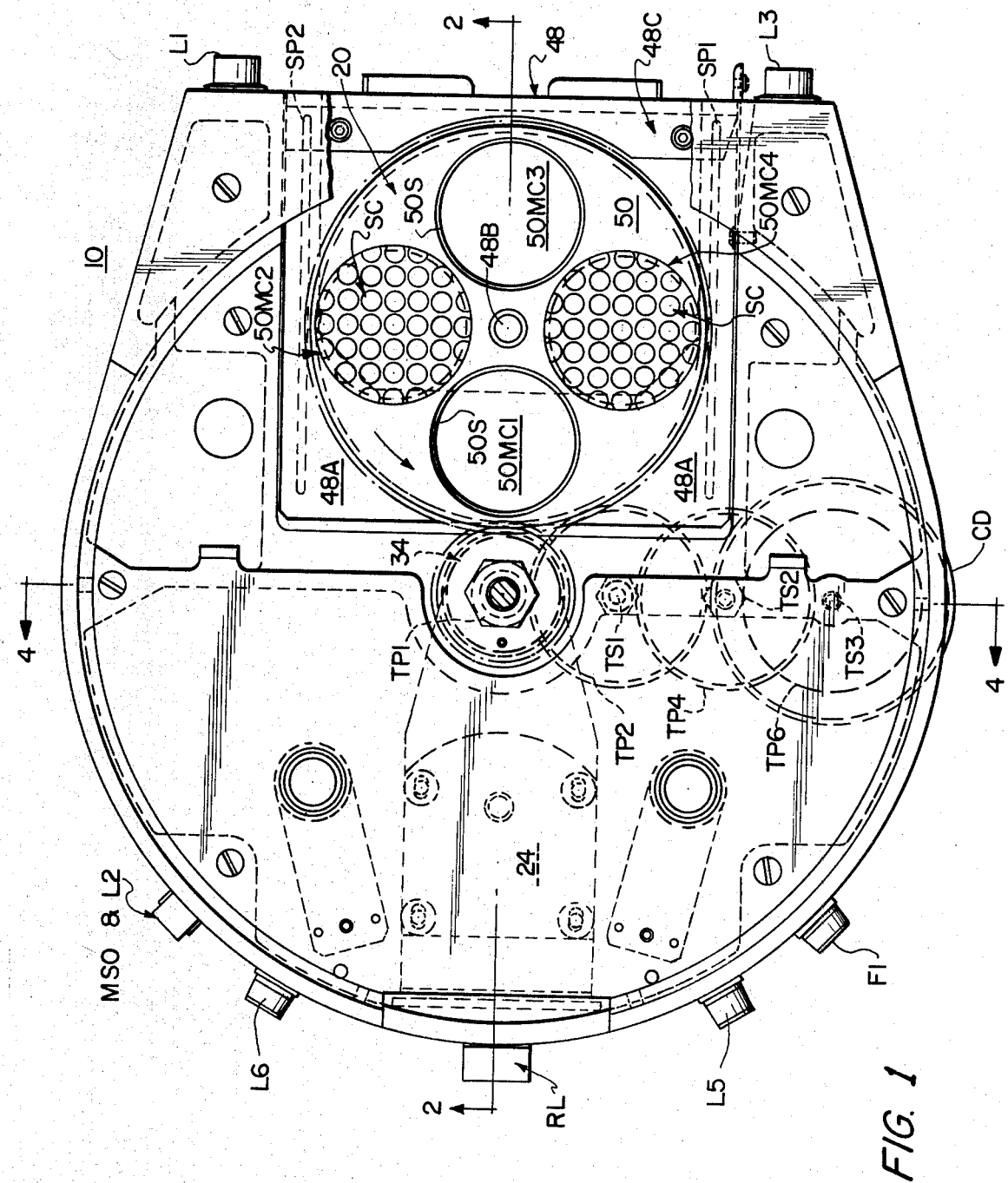
FIG. 1 is a top plan view of the soup dispenser with the reservoir for containing the soup or the like removed.

Referring in detail to FIGS. 1, 2, 3 and 4 of the drawings, the soup dispenser 10 of the present invention is shown as including a main housing assembly 12 telescopically receiving a reservoir container 14 which is preferably made of stainless steel or the like and which housing 12 further includes dual range heating bands 16 suitably mounted in the walls of the housing 12. A lid 18 (FIG. 3) is provided for the reservoir 14.

Figure 4:
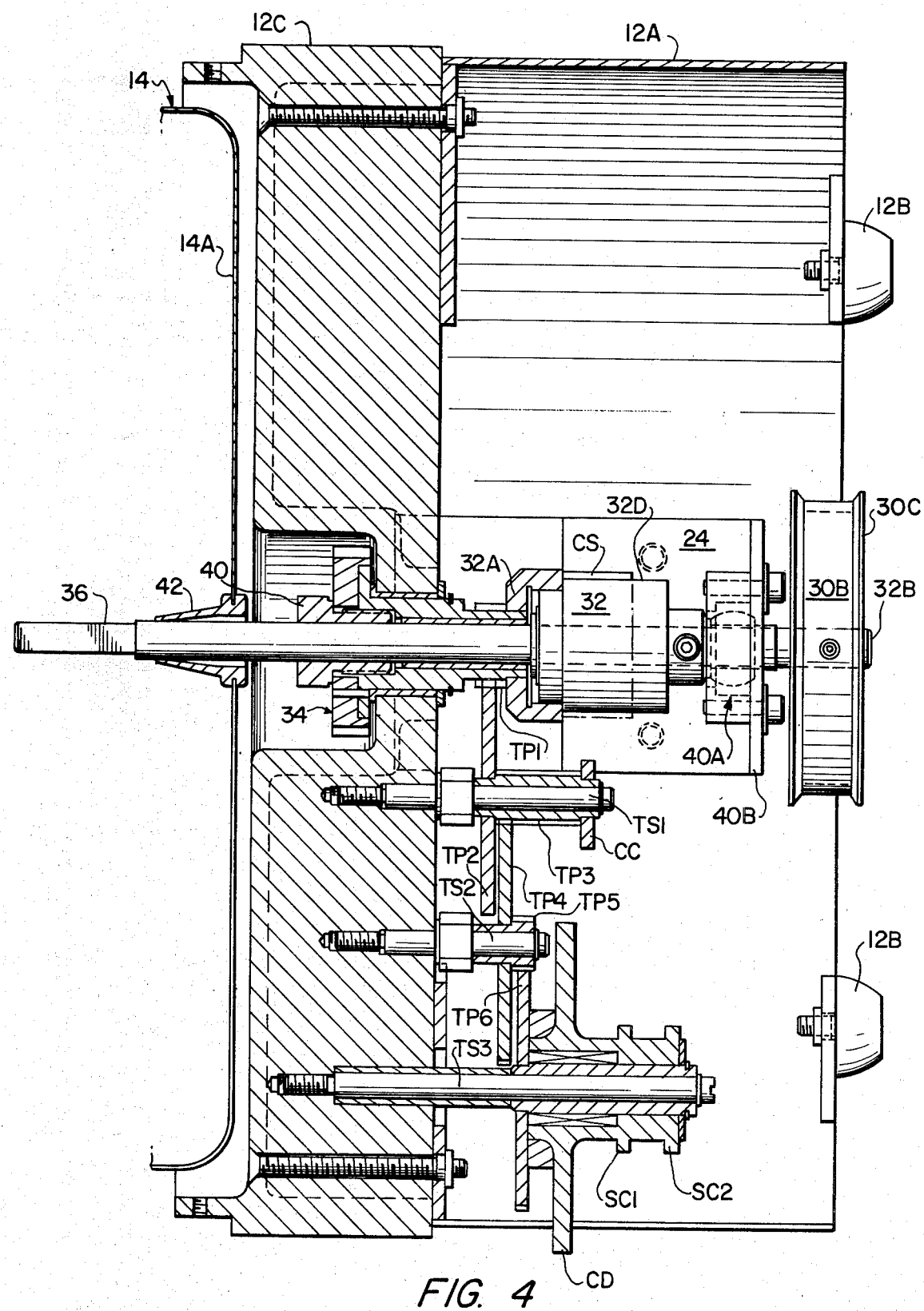
FIG. 4 is a partial cross-sectional detail taken along line 4—4 of FIG. 1, illustrating the dispensing control and monitoring mechanism of the soup dispenser of the present invention.

The main housing 12 includes a dependent supporting structure 12A, having a plurality of rubber feet 12B or the like beneath the bottom plate thereof to provide a housing and mounting structure for a dispensing assembly 20, to be hereinafter more fully described and for a drive motor 24. The drive motor 24 includes a cooling fan assembly 26 extending from the uppermost end thereof and has an extended output shaft 30 extending from the lowermost end thereof. A drive pulley 30A drives a power belt 30B from the output shaft 30 and the power belt 30B drives an input pulley 30C on the lowermost end of an input shaft 32B which is the input of a controlled revolution clutch 32. The clutch 32 has an output pinion gear 34 at the uppermost end thereof and an impeller shaft 36 coaxial with the output pinion gear 34 and rotatable internally thereof and internally of the clutch 32 as an extension of the input shaft 32B driven from the motor 24. The impeller shaft 36 mounts an impeller 38 on the uppermost end thereof within the reservoir 14 into which it extends through a bearing assembly 40 and a shaft seal 42 extending through the floor 14A of the reservoir 14. A bearing assembly 40A is provided on the same mounting bracket 40B which mounts the motor 24 in the lower portion 12A of the main housing structure 12 as illustrated in FIGS. 2 and 4, for mounting the lowermost end of the input shaft 32B, the latter comprising the lowermost end (extension) of the impeller shaft 36.

The dispensing assembly 20 includes an upper sealing plate 46, a lower sealing plate and drawer slide assembly 48 and a dial-shaped transfer plate assembly 50 therebetween.

Figure 7:
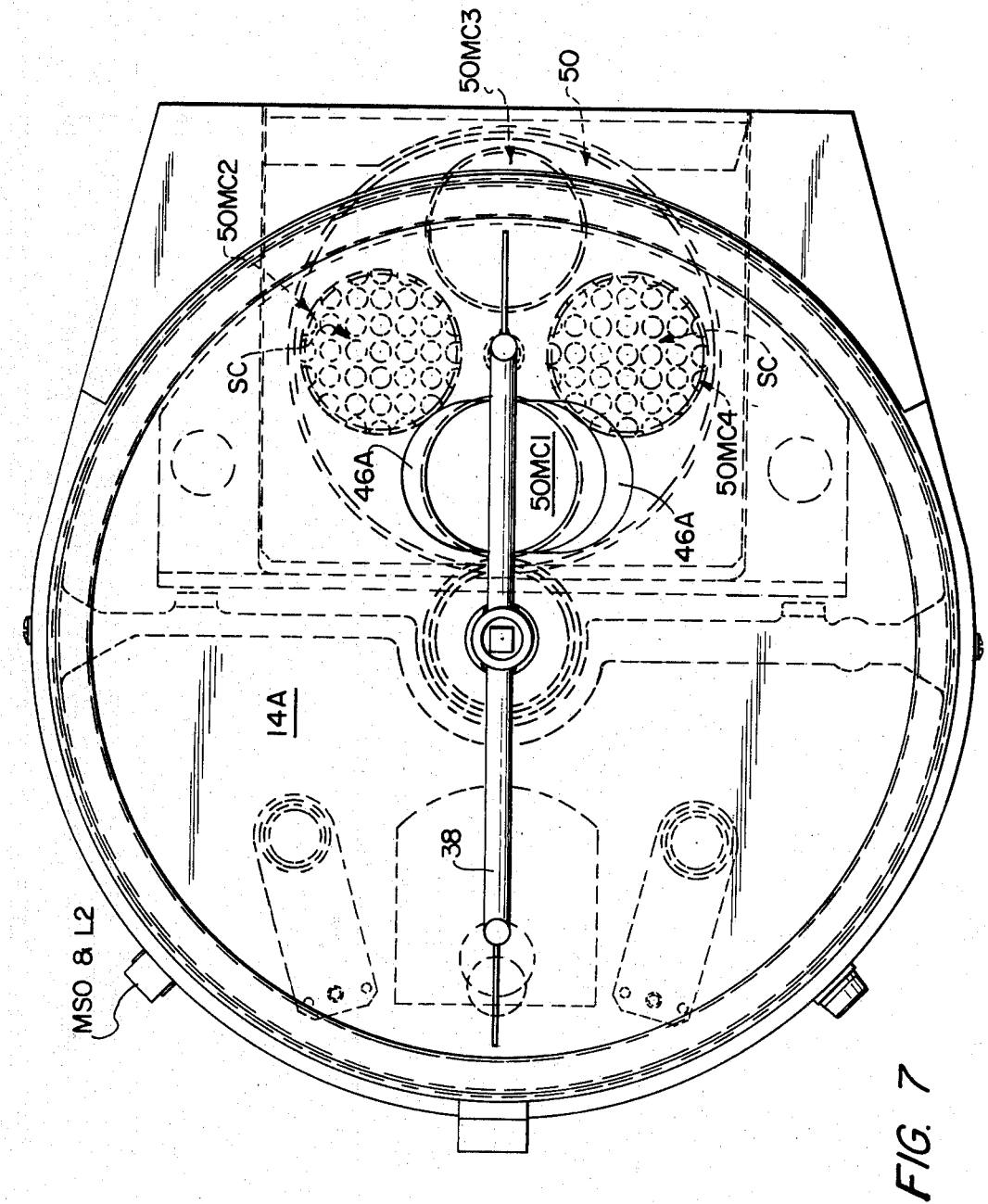
FIG. 7 is a top plan view of the soup dispenser with the reservoir in place.

The upper sealing plate 46 is welded to the bottom side of the bottom web 14A of the reservoir 14. Defined in the bottom 14A of the reservoir 14 is an arcuately shaped masking port 14B which is in registry with a similarly arcuately-shaped inlet port 46B in the top sealing plate 46 of the dispensing assembly 20. The intake port 46B in the top sealing plate 46 includes knife blades or knife edges 46A formed along opposed sides thereof such that the knife edges extend inboard of the masking port 14B in the reservoir 14 as best illustrated in FIG. 7.

Figure 2:
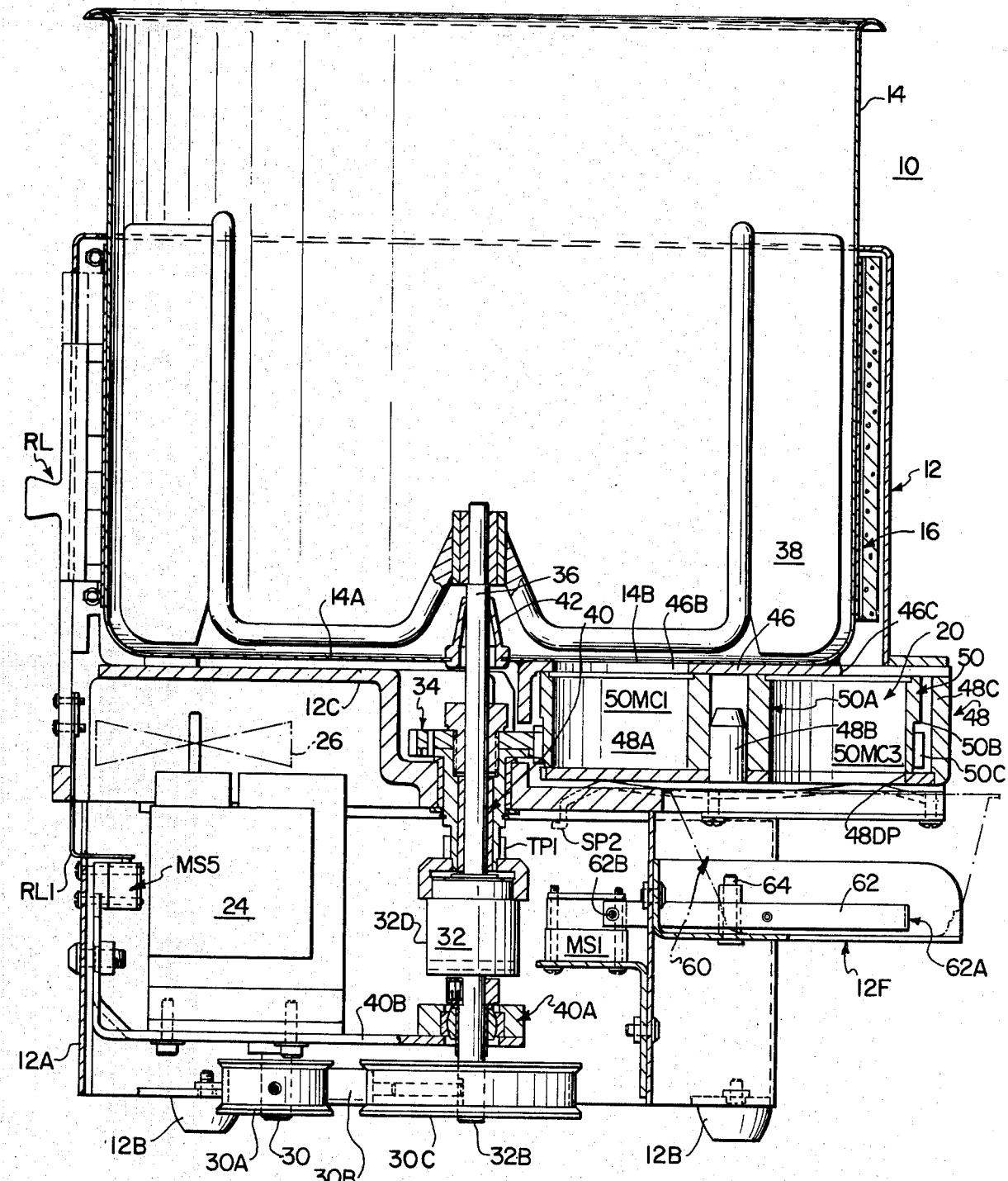
FIG. 2 is a cross-section taken along line 2—2 of FIG. 1 but with the reservoir replaced.

As illustrated in FIG. 2, the top sealing plate 46 terminates at an outboard edge beneath the outermost extremity of the reservoir bottom 14A in the provision of a venting port or opening for successively registered measuring chambers in the dial-shaped transfer plate assembly to be hereinafter more fully described. The venting path is directly to the right of the termination 46C of the upper seal plate over the top of the drawer slide assembly 48.

Referring to FIGS. 1, 2, 3, 5 and 7, the transfer plate assembly 50 is mounted in sliding, surface-sealed juxtaposition with the lower surface of the upper sealing plate 46. The transfer plate assembly 50 is configured as a cylindrical dial and is preferably coated in its entirety and any event over its upper and lower flat surfaces with a Food and Drug Administration approved friction reducing, high release material which will effectuate a sliding and rotating surface-to-surface seal between the upper and lower surfaces of the said cylindrical dial-shaped transfer plate, the lower surface of the upper sealing plate 46 and the upper surface of a lower sealing plate 48A comprising a portion of the drawer slide assembly 48.

The dispensing dial or transfer plate assembly 50 is shown as including a hollow hub portion 50A having a bore therein which fits over an upstanding indexing stub 48B on the lower sealing plate 48A to assure the proper alignment of the said dispensing dial or transfer plate assembly 50 and the lower sealing plate 48A in the drawer assembly 48 and with the said hollow hub 50A being surrounded by a plurality of radially disposed measuring cavities 50MC1 . . . 50MC4. These cavities comprise cylindrical cavities of, for example, a capacity of two fluid ounces each, for the purpose of measuring successive two-ounce portions of soup or the like contained in the reservoir 14 and delivering them to a discharge port 48DP formed in and through the lower sealing plate 48A in registry with the vent formed by the termination 46C of the upper sealing plate 46 in the dispensing assembly 20 beneath the reservoir 14.

Figure 3:
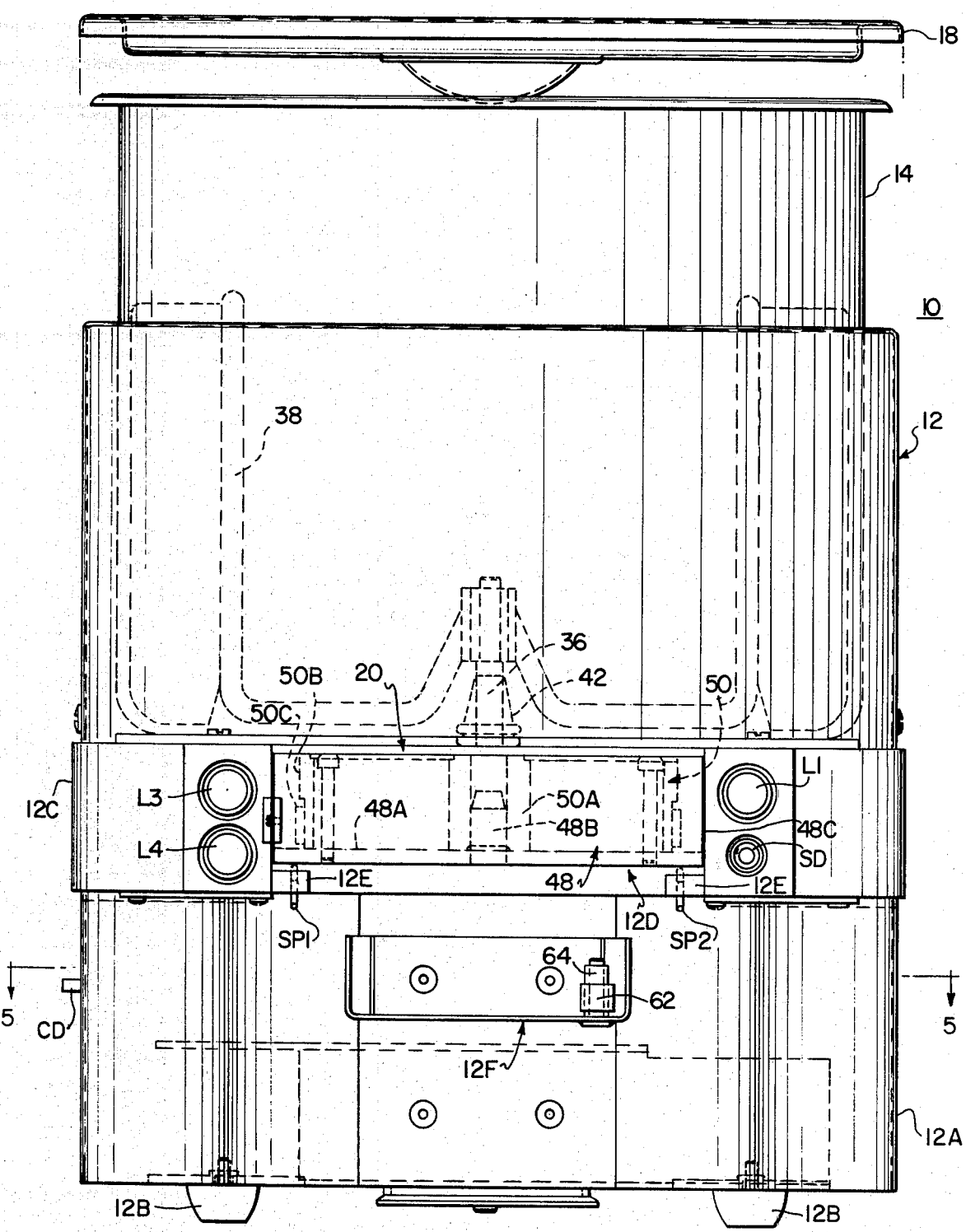
FIG. 3 is a front elevation of the dispensing assembly of the present invention.

The dispensing assembly 20 is maintained in assembled relationship by means of bent wire springs SP1 and SP2, best illustrated in FIGS. 2 and 3, which maintain the dispensing assembly within a drawer housing 12D on drawer slides or rails 12E by extending along the said slides 12E and being anchored in the latter, into suitably shaped spring-receiving slots or the like. The springs SP1 and SP2 thrust upward on the lower sealing plate 48A to force the latter upward against the transfer plate assembly 50 and, in turn, force the latter into sliding surface sealed engagement with the upper sealing plate 46. The cross-section of the dispensing assembly 20 most illustrative of the surface contact between the various components of the said dispensing assembly 20 is best illustrated in FIG. 2.

The transfer plate or dispensing dial assembly 50 is provided with an upper outer peripheral annular flange 50B which is vertically spaced from a ring gear 50C integrally formed about the periphery of the dial 50 and coaxially rotatable therewith.

As best shown in FIG. 1, the dial shaped transfer plate or dispensing dial assembly 50 is shown as including, within each of the measuring chambers 50MC1 . . . 50MC4, a counterbore 50S for receiving a cylindrical strainer or screen SC, which seats upon an internal annular shoulder defined by the lowermost portion of each counterbore 50S.

Each of the strainers or screens SC may be constructed of perforated sheet plastic material, metal, or screening or the like. By way of example the straining assemblies $S^C$ of FIGS. 1 and 7 are constructed of stainless steel with $\frac{1}{4}$-inch holes drilled therethrough in a grid pattern of substantial uniformity.

The strainers SC are flush with the uppermost surface of the dispensing dial 50, and thus maintained clean by the scraping action of the top plate assembly 46 and its knife edges 46A.

The dispensing drawer assembly 48 is further illustrated as including a conformal beader portion 48C which is coextensive in width with the lower sealing plate 48A and coextensive in height with the transfer plate assembly 50. Thus, the transfer plate assembly 50 is fully contained within the drawer housing 12D in the drawer assembly 48 as illustrated in FIGS. 2 and 3. This facilitates the removal of the transfer plate assembly 50 and lower sealing plate 48A as a unit with the drawer assembly 48 for subsequent disassembly and sterilization.

Figure 5:
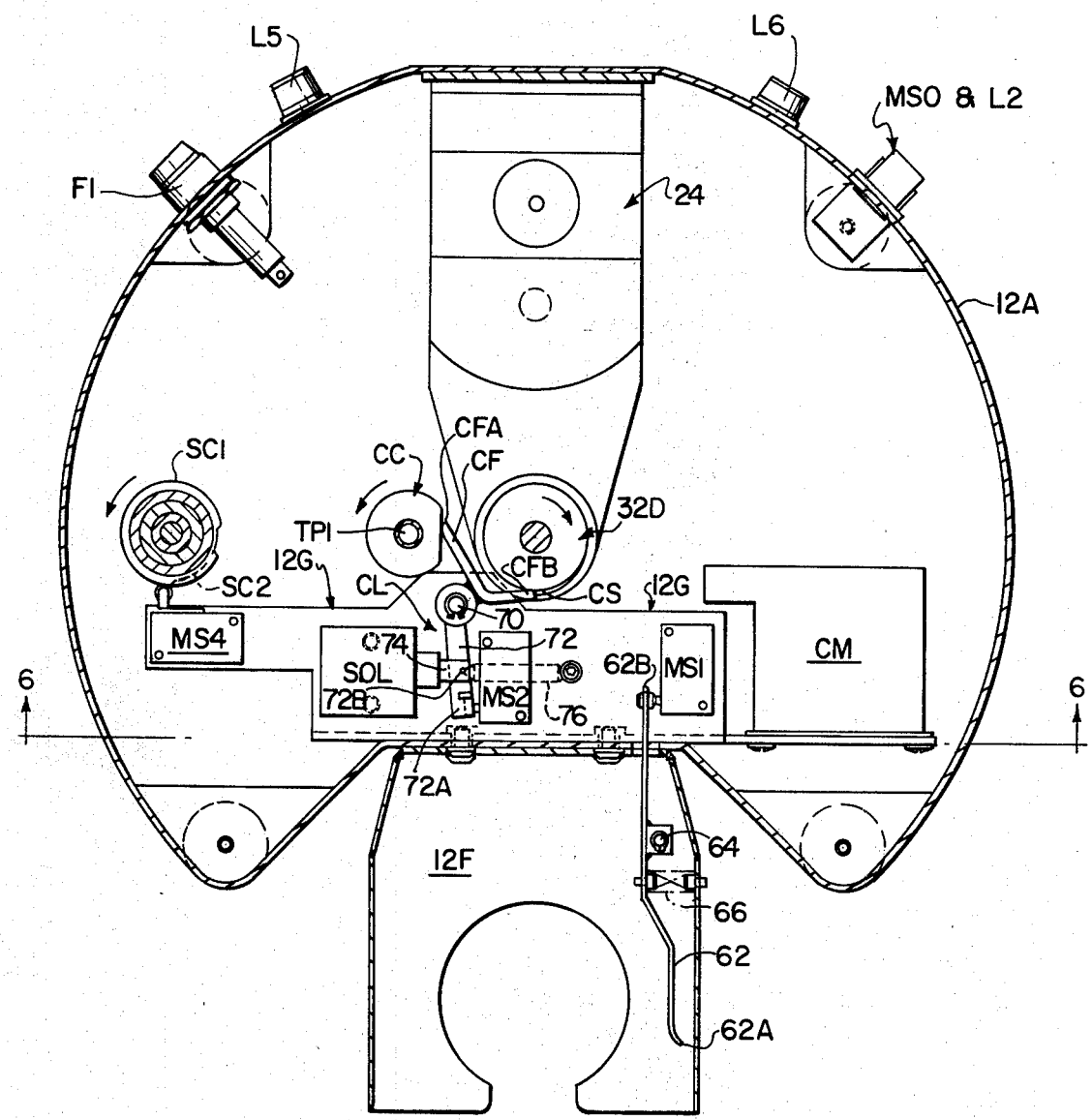
FIG. 5 is a cross-section taken along line 5—5 of FIG. 3.

Beneath the drawer housing 12D is a soup container receiving and supporting bracket or shelf 12F on which a container 60 is shown in phantom lines in FIG. 2. As shown in FIGS. 2, 3 and 5, a switch lever 62 is pivoted intermediate its ends on a pin 64 provided adjacent one side of the container shelf 12F for engagement at its free end 62A with a container 60 to rotate counterclockwise about the pin 64 and cause its opposite (inboard) end 62B to release a cup detecting microswitch MS1 in a control circuit to be hereinafter more fully described. The function of the cup detecting microswitch MS1 is to preclude dispensing by the dispenser 10 in the absence of a container 60 in position on the shelf 12F beneath the discharge port 48DP in the dispensing assembly 20. A compression spring 66 (FIG. 5) normally biases the lever 62 clockwise about the pin 64 to engage the inboard end 26B of the lever 62 with the cup dispensing microswitch MS1.

Now, with joint reference to FIGS. 1, 2, and 4, the means for driving the dispensing dial or transfer plate assembly 50 of the dispensing assembly 20 will be described.

The ring gear 50C peripherally disposed on the dispensing dial 50 is in engagement with the drive pinion 34 on the impeller shaft 36 of the controlled revolution clutch assembly 32 as clearly illustrated in FIGS. 1 and 2.

The controlled revolution clutch 32 is of a well-known type in the art and, for example, it is manufactured by the Marquette Metal Products Company, a wholly-owned subsidiary of Curtiss-Wright Corporation of Cleveland, Ohio, under the trade designation series D indexing clutch, of the shaft-in/hub-out type.

Referring to FIGS. 1, 2, 4, 5 and 6, the controlled revolution or indexing clutch 32 is shown as including (FIGS. 2 and 4) a timing pinion TP1 which rotates in synchronism with the clutch hub 32A and output or drive pinion 34 thereon which drives a second timing pinion TP2 mounted coaxially on a first timing shaft TS1 together with a lesser diameter third timing pinion TP3 and a clutch control cam CC at the lowermost end of the said first timing shaft TS1.

The third timing pinion TP3 drives a fourth timing pinion TP4 which in turn is mounted on a second timing shaft TS2 having a coaxially disposed fifth timing pinion TP5 at the lowermost end thereof. The fifth timing pinion TP5 is drivingly engaged with a sixth timing pinion TP6 which drives a third timing shaft TS3 on which are mounted a soup-serving counting dial CD, extending outboard of the housing 12A (best shown in FIGS. 1 and 4) and coaxially beneath the counting dial CD, first and second soup-serving counting cams SC1 and SC2, respectively, counting, for example, 25 and 20 servings for a purpose to be hereinafter more fully described.

The count in the counting cams SC1 and SC2 is generated by a predetermined number of cycles of clutch actuation corresponding at each cycle to one serving of soup or the like being dispensed by the dispensing device 10.

As shown in FIG. 4, the barrel 32D of the clutch 32 includes a control stop cam CS, the rise of this cam being illustrated in FIG. 4 and the helical configuration of the control stop CS being illustrated in FIG. 5.

Figure 6:
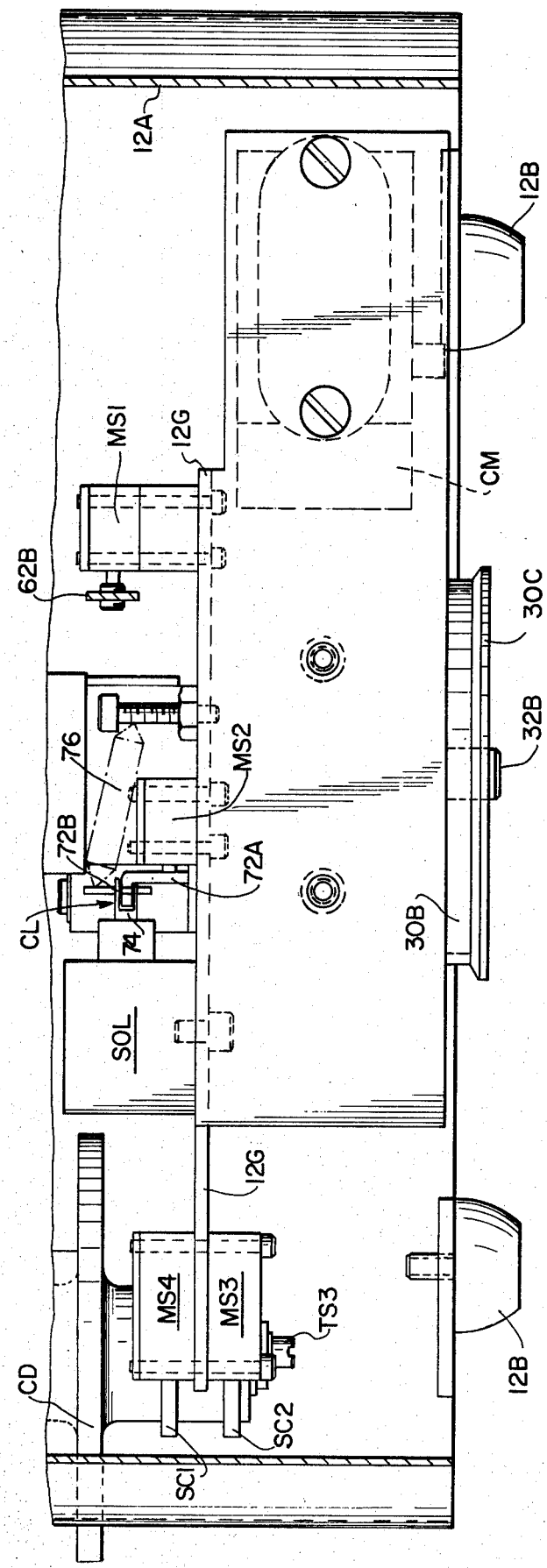
FIG. 6 is a cross-section taken along line 6—6 of FIG. 5.

A cam-control lever assembly CL is illustrated in FIGS. 5 and 6 as including a main pivot 70, an actuating arm 72 radially extending from the pivot 70 to an outboard end 72A which engages the actuating button of a second microswitch MS2 for controlling an indicator relay KR (FIG. 8), the said actuating arm 72 having a central connection 72B drawn in one direction by the armature 74 of a solenoid SOL and in the other direction by one end of a tension spring 76, the latter being anchored at its other end to the component bracket 12G within the housing 12A.

The pivot assembly 70 constitutes an upstanding cylindrical hub to which is welded a bellcrank shaped cammed follow lever CF having a first end CFA engaged with the periphery of the control cam CC and having its other end CFB slidingly engaged with the control stop surface CS on the barrel portion 32D of the indexing clutch 32.

In operation, when the solenoid SOL is energized, the armature 74 will be drawn inward against the action of the tension spring 76 and cause the end 72A of the actuating arm 72 to draw away from the actuating button of the microswitch MS2 and at the same time release the control stop CS from the end CFB of the bell crank shaped cam follower lever CF. This is caused by the rotation of the hub 70 which also lifts the first end CFA of the cam follower lever CF off of the flat portion of the clutch control cam CC for a period of time sufficient to permit the rise portion of that cam to engage the said first end CFA of the cam follower lever CF. This will hold the other end CFB of the cam follower lever CF off the surface of the control stop path CS on the barrel portion 32D of the indexing clutch 32 until such time as at least two plus revolutions of that clutch have occurred.

By way of further example, if the input shaft 32B to the clutch 32 turns at 50 revolutions per minute, the gear ratios are such that the first timing shaft TS1 will rotate at 16.66 rpm which will drive the second timing shaft TS2 at 3.33 rpm which will in turn drive the third timing shaft TS3 at 0.66 rpm such that the counting cams SC1 and SC2 together with the counting dial CD are driven at 0.66 rpm. Furthermore, every three revolutions of the drive pinion 34 of the clutch 32 corresponds to one complete revolution of the dispensing dial or transfer plate assembly 50 thereby indexing the four measuring chambers 50MC1 ... 50MC4 in succession with the discharge port 48DP and the lower sealing plate 48A of the drawer assembly 48 in the dispensing assembly 20 for each actuation of the said indexing clutch 32. Thus, a single serving of soup or the like constitutes the discharging of each of the four measuring chambers 50MC1 ... 50MC4 and the dispensing dial assembly or transfer plate assembly 50.

Therefore, every three revolutions of the clutch 32 correspond to a single serving of soup which in turn corresponds to a single count increment or rotation of the third timing shaft TS3 and correspondingly, a single counting instrument of the counting dial increment of the counting dial CD and the counting cams SC1 and SC2.

The first counting cam SC1 is illustrated as engaging the actuating button of a microswitch MS4 and the second counting cam SC2 engages, as generally illustrated in FIG. 6, an actuating button or input of a microswitch MS3.

As further illustrated in FIGS. 1 and 2, the reservoir 14 is held within the upper portion of the housing 12 by a suitable reservoir latch RL which consists of a sliding latch mechanism of any suitable design. The latch mechanism RL has a dependent L-shaped spring arm RL1 thereon which, when the latch is in its locked condition, actuates a microswitch MS5 mounted adjacent the drive motor 24 within the lower housing 12A. The microswitch MS5 is shown in position adjacent the motor 24 in FIG. 2.

As further shown in FIG. 3, there are three indicator lights L1, L3 and L4 on the front face of the soup dispenser 10 adjacent the drawer assembly 48, the light L1 being green, the light L3 being yellow, and the light L4 being red.

Another indicator lamp L2, which is red in color in a preferred embodiment, is illustrated in FIG. 5 and will be hereinafter more fully described.

As shown in FIGS. 1 and 5 and 7, there are fifth and sixth lights L5 and L6 on the back side of the housing 12, the said lamps L5 and L6 being red and yellow, respectively, to indicate the energization of the high power and low power heater coils, respectively. A fuse F1 is also positioned on the back side of the housing 12, as shown.

As shown in FIGS. 5 and 6, a circuit module CM is schematically displayed and as will be hereinafter more fully described in reference to FIG. 8, the module CM includes a master start switch MS0 which includes the red lamp L2 as an integral part thereof and energizes the said lamp L2 to indicate that power is on and the dispenser 10 is ready to be energized. The circuit module CM can also include within its structure the indicating relay KR and its contacts pairs LR1, LR2 and LR3 which are normally closed, normally opened, and normally closed, respectively. A pair of leads PL1 and PL2 connected across a 110 volt alternating current source and including a ground lead GL provide the input power to the control circuit of the present invention as illustrated in FIG. 8.

The first power lead PL1 feeds through a fuse F1 through the master start switch MS0 through the red front indicator lamp L2 to the second lead PL2 in one branch and from the master start switch MS0 and the tank-in-place or tank locked microswitch MS5 to one side of the cup detecting microswitch MS1. The cup detecting microswitch MS1 includes cup-in-place terminals which are closed in response to the presence of a cup in series with a start dispense switch SD which in turn is in series with the normally closed relay contact pair LR1 and the winding of the solenoid SOL which is connected on its far end to the second power lead PL2. The no-cup contact pair of the cup detector switch MS1 is in series with the normally open second contact pair LR2 of the indicator relay KR and thence in series through the winding of the said indicator relay KR to the second power lead PL2. Another branch circuit across the power lines PL1 ad PL2 commences from the power line PL1 through the second microswitch MS2 which is actuated by the actuating arm 72 on the clutch control lever assembly CL, the said control switch MS2 being in series with the normally closed third relay contact pair LR3 and the winding of the said indicating relay KR as well as in series with the first green indicator lamp L1 on the front of the dispenser 10 across the said power leads PL1 and PL2.

Figure 8:
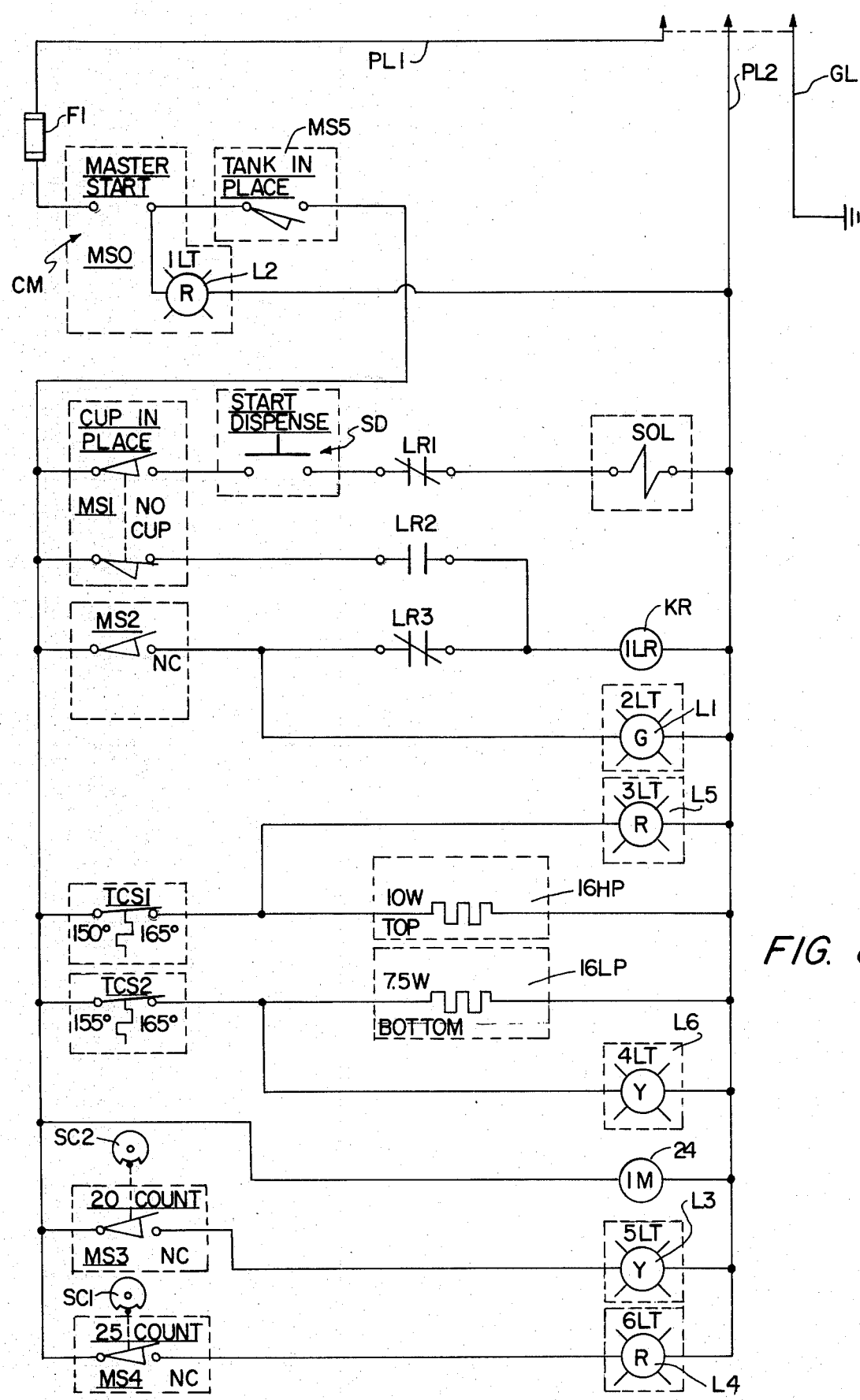
FIG. 8 is a schematic of the control circuit of the soup dispenser of the present invention.

The circuit module CM may also include first and second thermostat control switches TCS1 and TCS2 which from the power line PL1 extend in series first with the red and yellow backside indicator lamps L5 and L6, respectively, and thence in series with the high-power and low-power heater elements identified as 16HP and 16LP, respectively, in FIG. 8. Thus, the corresponding indicator lamps for indicating the condition of actuation of the respective heaters 16HP and 16LP are in parallel with the said heaters. The drive motor 24 is illustrated in FIG. 8 as being connected directly across the power leads PL1 and PL2 and the 20 and 25 count microswitches MS3 and MS4 are connected, respectively, in series with the third yellow lamp L3 and fourth red lamp L4 on the front of the dispenser 10 to indicate when, respectively, 20 and 25 servings of soup have been achieved by the dispenser 10.

OPERATION OF THE INVENTION

Referring to FIGS. 1–8 jointly, it will be assumed for the sake of description of the operation of the dispenser 10 that the power has been properly supplied to the control circuit of FIG. 8 and that the master start switch MS0 and tank in-place switch MS5 are closed to complete the power circuit to the remainder of the control devices of the present invention.

It is also assumed at this time that there is no cup in place on the cup-receiving shelf 12F of the dispenser and that the dispenser counting dial CD has been set to 0 together with a 0 position of the counting cams SC1 and SC2 such that the 20 and 25 count microswitches MS3 and MS4 are both open. This condition dictates that both the lamps L3 and L4 on the front of the dispenser 10 are extinguished at this point in time and that the only lamp presently lit on the front of the device is the second lamp L2 which is red in color.

A container such as the container 60 in FIG. 2 is placed upon the container support bracket 12F thereby engaging the lever arm 62 and causing closure of the cup-in-place contacts of the cup detector switch MS1. This readies the apparatus for depression of a start dispense switch SD which is located in any suitable position with respect to the dispenser and because of the normally closed first set of relay contacts LR1 current is conducted through the winding of the solenoid SOL which draws the armature 74 thereof inward pulls the actuator arm 72 of the clutch control lever CL away from the microswitch MS2 which closes and thereby energizes the indicator relay KR through the normally closed relay contact pair LR3. This action of the clutch controlled microswitch MS2 also illuminates the first lamp L1 on the front of the dispenser 10 which is green in color and thereby indicates that the dispensing cycle is in progress.

The energization of the indicator relay KR is momentary in nature since it opens its own closed contacts LR1 and LR3 to thereby de-energize the solenoid SOL and thereby commit the control of the control linkage or lever assembly CL to the clutch control cam CC which by this time has rotated sufficiently such that the engaging end CFA of the cam follower lever CF is on the rise portion of the clutch control cam CC and out of engagement with the cam stop control surface CS thereby permitting the clutch to rotate, rotating its drive cam 34 which in turn rotates the dispensing dial or transfer plate assembly 50 to commense dispensing of four measured quantities of soup from the reservoir 14 out through the discharge port 48DP and into the container 60.

As previously described, once the control cam CC has made a number of revolutions in excess of two, its flat surface is engaged with the contacting end CFA of the cam follower lever CF permitting the other end CFB of that lever CF to engage the control stop surface CS on the barrel 32D of the clutch 32 such that when the clutch has completed a third revolution the flat or detent surface of the control stop surface CS will engage the end CFB of the cam follower lever CF and cause the clutch to cease its rotation thereby bringing the drive pinion 34 and the dispensing dial or transfer plate assembly 50 to a halt at its original position.

When this occurs, the microswitch MS2 is opened and the green lamp L1 on the front of the dispenser 10 is extinguished. Then, the container 60 is removed opening the cup-in-place contacts of the first microswitch MS1 and causing the no-cup contacts to close.

This process is continued by pressing the start dispense switch SD for each helping or serving of soup to be placed in a container 60. After twenty such dispensing cycles have been conducted, the counting cam SC2 will have rotated to a point where it will energize the 20 count microswitch MS3 causing its contacts to close and the front yellow indicator lamp L3 to be illuminated indicating to the operator that twenty helpings have been dispensed and that in a short period of time, as indicated by the universal caution color yellow, it will be necessary to add more soup stock to the reservoir 14. It has been determined that in a 50 serving capacity reservoir 14, a 25 serving remainder or residue is the point in time in which additional soup stock must be added at a preheated temperature of, for example, 160°, such that the heaters 16HP and 16LP can pick up the load occasioned by the addition of this soup without incurring any down time from the serving process. This is invaluable in retail establishments where fast food serving must be observed in order to maintain proper customer relations.

Accordingly, upon the dispensing of a twenty-fifth serving (the completion of a twenty-fifth complete dispensing cycle as previously described), the 25 count cam SC1 will actuate the 25 count microswitch MS4 to illuminate the fourth lamp L4 on the front of the dispenser 10 which is a red color indicating stop dispensing and add more soup to the reservoir 14.

Also, the counting dial CD is an additional visual indication of the amount of servings which have been dispensed and can be used as a 0 setting device at the beginning of a serving day to be sure that the count of portions dispensed starts at 0.

As can be seen from the foregoing specification and drawings, the present invention provides a unique and novel soup dispensing device which is highly useful in fast food and high volume environments for providing accurate measured quantities of high quality soups and the like to a multiplicity of customers in rapid succession with the elimination of down time due to its unique indication and refill capabilities such that the self-contained heating mechanisms therein will pick up the load of added soup stock and recover to serving temperature within the serving temperature range and without any down time for such recovery.

It should be understood that the SOUP DISPENSER of the present invention may be modified as would occur to one of ordinary skill in the art without departing from the spirit and scope of the present invention.

It is claimed:

1. In a dispensing assembly for dispensing successive measured portions of liquid or semi-liquid food product from a heated reservoir at a desired serving temperature, said reservoir having a capacity of a predetermined number of serving portions and a predetermined number of served portions after which the said reservoir should be refilled to capacity to maintain said desired serving temperature without down time for thermal recovery, the invention comprising:
   cyclic dispensing means connected with said reservoir for delivering a said serving portion from said reservoir for each operating cycle thereof; and
   monitoring means responsive to the cyclic operation of said cyclic dispensing means for indicating the occurrence of a predetermined number of served portions dispensed from said reservoir by said cyclic dispensing means, said monitoring means including first and second detecting and indicating means for detecting and indicating, respectively, the impending occurrence and actual occurrence of said predetermined number of served portions.

2. The invention defined in claim 1, which further comprises:
   serving container support means for supporting a serving container adjacent said cyclic dispensing means to receive a said serving portion dispensed thereby;
   drive means for said cyclic dispensing means; and
   control circuit means for interconnecting said drive means with an energizing power source;
   said control circuit means including lockout switch means on said serving container support means for enabling and precluding energization of said drive means in response to the presence and absence, respectively, of a serving container on said serving container support means.

3. A dispensing assembly for dispensing volumes of liquid or semi-liquid food product from the bottom of a reservoir by gravity filling and emptying, comprising:
   a rotary dial shaped transfer plate means having a circular pattern of substantially identically configured measuring chambers formed therein and extending therethrough parallel to a central axis of rotation;
   a housing for said transfer plate means open at its top and having a supporting plate across the bottom thereof coextensive with said transfer plate means, said supporting plate having a discharge opening formed therein of substantially identical configuration as said measuring chambers for successive registry therewith in response to rotations of said transfer plate means on said central axis of rotation within said housing;
   strainer means insertably mounted in selected ones of said measuring chambers substantially precluding the ingestion of garnish therethrough into a corresponding said measuring chamber;
   sealing plate means fixed from rotation above said transfer plate means and overlying said transfer plate means, said sealing plate means having an intake port formed therein in registry with successive ones of said measuring chambers during rotation of said transfer plate means;
   said sealing plate means being relieved in the vicinity of said discharge opening to provide vent means for successive ones of said measuring chambers;
   drive means interconnected with said transfer plate means selectively actuated for rotating the latter in an amount to register a predetermined number of measuring chambers together with said selectively inserted strainer means with said intake port and said discharge opening for each selective actuation of said drive means; and
   monitoring means responsive to each selective actuation of said drive means for indicating the occurrence of a predetermined number of such actuations as a measure of a predetermined number of portions dispensed by said dispensing assembly.

4. The invention defined in claim 3, wherein said monitoring means includes first and second detecting and indicating means for detecting and indicating, respectively, the impending occurrence and actual occurrence of said predetermined number of portions.

5. The invention defined in claim 3, which further comprises:
   serving container support means for supporting a serving container adjacent said dial shaped plate means to receive a said serving portion dispensed thereby; and control circuit means for interconnecting said drive means with an energizing power source;

said control circuit means including lockout switch means on said serving container support means for enabling and precluding energization of said drive means in response to the presence and absence, respectively, of a serving container on said serving container support means.

6. The invention defined in claim 5, wherein said monitoring means includes first and second detecting and indicating means for detecting and indicating, respectively, the impending occurrence and actual occurrence of said predetermined number of portions.

7. A dispensing assembly for dispensing volumes of liquid or semi-liquid food product containing broth and garnish from the bottom of a reservoir by gravity filling and emptying, comprising:

a rotary dial shaped plate means having a circular pattern of substantially identically configured measuring chambers formed therein and extending therethrough parallel to a central axis of rotation, said rotary dial shaped plate means being selectively rotatably indexed during dispensing;

a housing for said dial plate means open at its top and having a supporting plate across the bottom thereof coextensive with said dial plate means, said supporting plate having a discharge opening formed therein of substantially identical configuration as said measuring chambers for successive registry therewith in response to rotations of said dial plate means on said central axis of rotation within said housing;

strainer means insertably mounted in selected ones of said measuring chambers substantially precluding the ingestion of garnish therethrough into a corresponding said measuring chamber;

sealing plate means fixed from rotation above said dial plate means and overlying said dial plate means, said sealing plate means having an intake port formed therein in registry with successive ones of said measuring chambers during rotation of said dial plate means and an opening in the area above the said discharge opening; and monitoring means responsive to each selective indexing of said rotary dial shaped plate means for indicating the occurrence of a predetermined number of indexing operations as a measure of a predetermined number of portions dispensed by said dispensing assembly.

8. The invention defined in claim 7, wherein said monitoring means includes first and second detecting and indicating means for detecting and indicating, respectively, the impending occurrence and actual occurrence of said predetermined number of portions.

9. The invention defined in claim 7, which further comprises:

serving container support means for supporting a serving container adjacent said dial shaped plate means to receive a said serving portion dispensed thereby;

drive means for said dial shaped plate means; and control circuit means for interconnecting said drive means with an energizing power source;

said control circuit means including lockout switch means on said serving container support means for enabling and precluding energization of said drive means in response to the presence and absence, respectively, of a serving container on said serving container support means.

10. The invention defined in claim 9, wherein said monitoring means includes first and second detecting and indicating means for detecting and indicating, respectively, the impending occurrence and actual occurrence of said predetermined number of portions.

11. The invention of any one of claims 3–10, wherein said housing for said transfer plate means comprises a removable drawer assembly slidably mounted on said dispensing assembly beneath said reservoir and said sealing plate means.

12. A dispensing assembly for dispensing volumes of liquid or semi-liquid food product from the bottom of a reservoir by gravity filling and emptying, comprising:

a rotary dial shaped transfer plate means having a circular pattern of sustantially identically configured measuring chambers formed therein and extending therethrough parallel to a central axis of rotation;

a housing for said transfer plate means open at its top and having a supporting plate across the bottom thereof coextensive with said transfer plate means, said supporting plate having a discharge opening formed therein of substantially identical configuration as said measuring chambers for successive registry therewith in response to rotations of said transfer plate means on said central axis of rotation within said housing;

sealing plate means fixed from rotation above said transfer plate means and overlying said transfer plate means, said sealing plate means having an intake port formed therein in registry with successive ones of said measuring chambers during rotation of said transfer plate means;

said sealing plate means being relieved in the vicinity of said discharge opening to provide vent means for successive ones of said measuring chambers;

drive means interconnected with said tranfer plate means selectively actuated for rotating the latter in an amount to register a predetermined number of measuring chambers with said intake port and said discharge opening for each selective actuation of said drive means; and monitoring means responsive to each selective actuation of said drive means for indicating the occurrence of a predetermined number of such actuations as a measure of a predetermined number of portions dispensed by said dispensing assembly.

13. The invention defined in claim 12, wherein said monitoring means includes first and second detecting and indicating means for detecting and indicating, respectively, the impending occurrence and actual occurrence of said predetermined number of portions.

14. The invention defined in claim 12, which further comprises:

serving container support means for supporting a serving container adjacent said dial shaped plate means to receive a said serving portion dispensed thereby; and control circuit means for interconnecting said drive means with an energizing power source;

said control circuit means including lockout switch means on said serving container support means for enabling and precluding energization of said drive means in response to the presence and absence, respectively, of a serving container on said serving container support means.

15. The invention defined in claim 14, wherein said monitoring means includes first and second detecting and indicating means for detecting and indicating, respectively, the impending occurrence and actual occurrence of said predetermined number of portions.

16. A dispensing assembly for dispensing volumes of liquid or semi-liquid food product containing broth and garnish from the bottom of a reservoir by gravity filling and emptying, comprising:

a rotary dial shaped plate means having a circular pattern of substantially identically configured measuring chambers formed therein and extending therethrough parallel to a central axis of rotation, said rotary dial shaped plate means being selectively rotatably indexed during dispensing;

a housing for said dial plate means open at its top and having a supporting plate across the bottom thereof coextensive with said dial plate means, said supporting plate having a discharge opening formed therein of substantially identical configuration as said measuring chambers for successive registry therewith in response to rotations of said dial plate means on said central axis of rotation within said housing;

sealing plate means fixed from rotation above said dial plate means and overlying said dial plate means, said sealing plate means having an intake port formed therein in registry with successive ones of said measuring chambers during rotation of said dial plate means and an opening in the area above the said discharge opening; and monitoring means responsive to each selective indexing of said rotary dial shaped plate means for indicating the occurrence of a predetermined number of indexing operations as a measure of a predetermined number of portions dispensed by said dispensing assembly.

17. The invention defined in claim 16, wherein said monitoring means includes first and second detecting and indicating means for detecting and indicating, respectively, the impending occurrence and actual occurrence of said predetermined number of portions.

18. The invention defined in in claim 16, which further comprises:

serving container support means for supporting a serving container adjacent said dial shaped plate means to receive a said serving portion dispensed thereby;

drive means for said dial shaped plate means; and control circuit means for interconnecting said drive means with an energizing power source;

said control circuit means including lockout switch means on said serving container support means for enabling and precluding energization of said drive means in response to the presence and absence, respectively, of a serving container on said serving container support means.

19. The invention defined in claim 18, wherein said monitoring means includes first and second detecting and indicating means for detecting and indicating, respectively, the impending occurrence and actual occurrence of said predetermined number of portions.

20. The invention of any one of claims 12, 13, 14, 15, 16, 17, 18 or 19, wherein said housing for said transfer plate means comprises a removable drawer assembly slidably mounted on said dispensing assembly beneath said reservoir and said sealing plate means.

* * * * *